(12) United States Patent
Sharma et al.

(10) Patent No.: US 8,725,918 B2
(45) Date of Patent: May 13, 2014

(54) CABLE WITH FADE AND HOT PLUG FEATURES

(75) Inventors: Anup K. Sharma, Sunnyvale, CA (US); Scott P. Krueger, San Francisco, CA (US); James M. Hollabaugh, San Jose, CA (US); Roberto G. Yepez, San Francisco, CA (US); Mitchell D. Adler, Los Gatos, CA (US); Brijesh Tripathi, San Jose, CA (US); Jeffrey J. Terlizzi, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/494,179

(22) Filed: Jun. 12, 2012

(65) Prior Publication Data

US 2013/0227631 A1    Aug. 29, 2013

Related U.S. Application Data

(60) Provisional application No. 61/604,764, filed on Feb. 29, 2012.

(51) Int. Cl.
*G06F 13/38* (2006.01)
*G09G 3/34* (2006.01)

(52) U.S. Cl.
USPC ............ 710/72; 710/305; 345/156; 345/204; 386/231

(58) Field of Classification Search
USPC ............... 710/62–72, 305; 345/156, 204; 386/231, 232
See application file for complete search history.

(56) References Cited

U.S. PATENT DOCUMENTS

| 4,764,812 | A   | * | 8/1988  | Hamley ................. 348/512 |
|-----------|-----|---|---------|---------------------------------|
| 7,151,820 | B2  |   | 12/2006 | Vejlgaard                       |
| 7,426,585 | B1  |   | 9/2008  | Rourke                          |
| 7,811,119 | B2  |   | 10/2010 | Caveney et al.                  |
| 8,028,094 | B2  |   | 9/2011  | Sahdra                          |
| 8,028,097 | B2  |   | 9/2011  | Iwamura                         |
| 8,069,465 | B1  |   | 11/2011 | Bartholomay                     |
| 2004/0120698 | A1 | * | 6/2004  | Hunter ................. 386/124 |
| 2005/0053286 | A1 |   | 3/2005  | Chuang et al.                   |
| 2006/0208997 | A1 |   | 9/2006  | Sunohara et al.                 |
| 2006/0267989 | A1 |   | 11/2006 | Campbell                        |
| 2007/0073958 | A1 |   | 3/2007  | Kalayjian                       |
| 2007/0083905 | A1 |   | 4/2007  | Lee                             |
| 2007/0195098 | A1 | * | 8/2007  | Hirose et al. ............ 345/473 |

(Continued)

OTHER PUBLICATIONS

U.S. Appl. No. 13/494,169, filed Jun. 12, 2012, inventor Sharma et al.

(Continued)

*Primary Examiner* — Christopher Shin
(74) *Attorney, Agent, or Firm* — Lawrence J. Merkel; Meyertons, Hood, Kivlin, Kowert & Goetzel, P.C.

(57) ABSTRACT

In an embodiment, a host computing device includes an internal display and also includes a connector to connect to an external display. A cable is provided to connect to the connector and to connect to the external display. The cable includes video processing capabilities. For example, the cable may include a memory configured to store a frame buffer. The frame buffer may store a frame of video data for further processing by the video processing device in the cable. The video processing device may manipulate the frame in a variety of ways, e.g. scaling, rotating, gamma correction, dither correction, etc.

13 Claims, 8 Drawing Sheets

(56) References Cited

U.S. PATENT DOCUMENTS

| | | |
|---|---|---|
| 2008/0022023 A1* | 1/2008 | Kim et al. ............... 710/72 |
| 2008/0056722 A1 | 3/2008 | Hendrix et al. |
| 2008/0170058 A1* | 7/2008 | Ahn et al. ............... 345/211 |
| 2009/0061678 A1 | 3/2009 | Minoo et al. |
| 2009/0094663 A1* | 4/2009 | Ben-Yaacov et al. ......... 725/141 |
| 2010/0208830 A1 | 8/2010 | Lowe |
| 2010/0295994 A1 | 11/2010 | Kaplan |
| 2010/0307325 A1* | 12/2010 | Appel ............... 84/743 |
| 2011/0268419 A1* | 11/2011 | Hirose et al. ............... 386/224 |
| 2012/0000705 A1 | 1/2012 | Cornelius et al. |

OTHER PUBLICATIONS

International Search Report and Written Opinion in related Application No. PCT/US2013/024603, May 14, 2013, pp. 1-10.

Office Action from U.S. Appl. No. 13/494,169, mailed Oct. 7, 2013, pp. 1-10.

* cited by examiner

CABLE WITH FADE AND HOT PLUG FEATURES

This application claims benefit of priority to U.S. Provisional Patent Application Ser. No. 61/604,764, filed on Feb. 29, 2012.

BACKGROUND

1. Field of the Invention

This invention is related to the display of images by a computing system, including connecting to an external display and displaying images on the external display.

2. Description of the Related Art

In some situations, there is a need to display the same images concurrently on multiple displays of a computer system. For example, consider a system with a computing device having an internal display and an external interface to which an external display is coupled. This system may be used for a presentation—or example, a software demonstration to an audience in a large room. The presenter may view the demonstration on the device's internal display while the audience views the demonstration on the external display. In making such a presentation, it is typically desirable for the two displays to show the same images at the same time (or at least such that differences between the two displays are not visually apparent). Achieving such a result, however, may require significant resources of the computing device. Such an allocation of resources may not make sense from a design standpoint, particularly where circuitry real estate is at a premium on the computing device (e.g., the computing device is a tablet or smart phone device) and the presentation feature described above is not frequently used. Further complicating the situation is the multiplicity of possible external displays of differing resolutions and other properties that may be attached to the computing device.

SUMMARY

In an embodiment, a host computing device includes an internal display and also includes a connector to connect to an external display. A connection device (e.g. a cable) is provided to connect to the connector and to connect to the external display. The cable includes not only the transmission media to carry the video/audio signals to the external display, but also includes video processing capabilities. For example, the cable may include a memory configured to store a frame buffer. The frame buffer may store a frame of video data for further processing by the video processing device in the cable. The video processing device may manipulate the frame in a variety of ways, e.g. scaling, rotating, gamma correction, dither correction, etc. Additionally, the video processing device may format the image for a different communication standard. For example, the host computing system may output a DisplayPort interface, and the video processing device may output a high definition multimedia interface (HDMI), video graphics adapter (VGA) interface, etc. The video processing device may also output a DisplayPort interface and thus there may be no reformatting for the corresponding standard. In other embodiments, the host computing device may output other video or multimedia interfaces as well.

BRIEF DESCRIPTION OF THE DRAWINGS

The following detailed description makes reference to the accompanying drawings, which are now briefly described.

Figure 1:
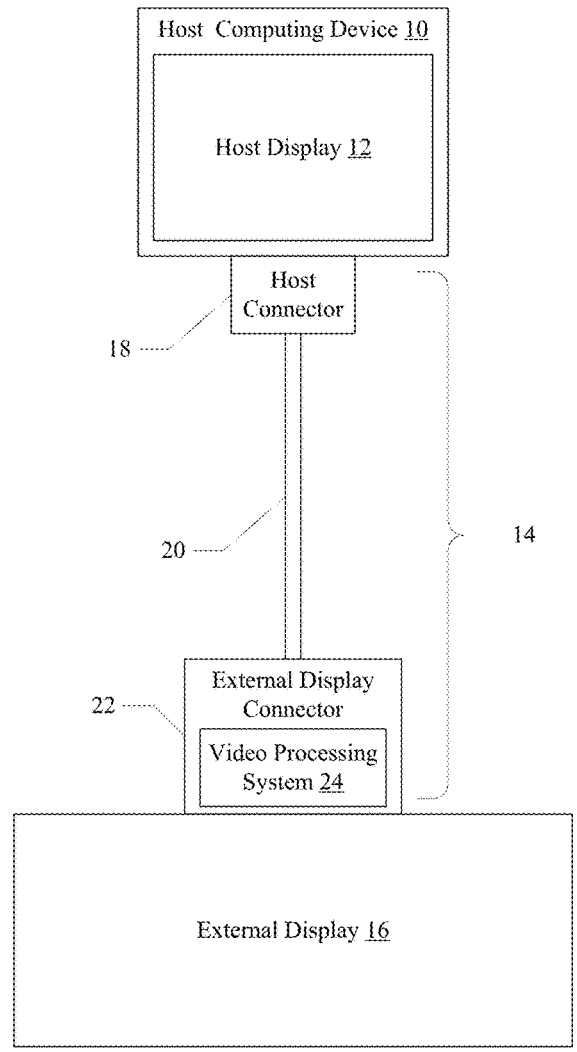
FIG. 1 is a block diagram of one embodiment of a host computing device coupled to an external display using a cable having a video processing system included therein.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits and/or memory storing program instructions executable to implement the operation. The memory can include volatile memory such as static or dynamic random access memory and/or nonvolatile memory such as optical or magnetic disk storage, flash memory, programmable read-only memories, etc. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

DETAILED DESCRIPTION OF EMBODIMENTS

Turning now to FIG. 1, a block diagram of a system with multiple displays is shown. As shown, the system includes a host computing device 10 (which may include a host display 12), a cable 14, and an external display 16. The cable 14 connects the host computing device 10 to the external display 16. In the illustrated embodiment, the cable 14 includes a host connector 18, transmission media (e.g. wires) 20, and an external display connector 22. The external display connector 22 includes an embedded video processing system 24.

The host computing device 10 may be any type of computing device. In an embodiment, the host computing device 10 may be a tablet computer such as the iPad™ family of devices available from Apple Inc. In another embodiment, the host computing device 10 may be a smart phone such as the iPhone™ family of devices available from Apple Inc. or various Android-based smart phones. In other embodiments, the host computing device 10 may include any other type of computing device such as a laptop computer, net top computer, desktop computer, workstation, server, etc.

As shown, the host computing device 10 is coupled to (or includes in the same physical housing) the host display 12. This display may be referred to as the "primary" display of host computing device 10. In some embodiments, the primary display 12 may be connected to the device 10 through an external interface. However, in portable embodiments such as the tablet or smart phone mentioned above, the host display 12 may be integrated into the device 10 itself As used herein, a display refers to any device that is configured to present a visual image in response to control signals to the display. A variety of technologies may be used in the display, such as cathode ray tube (CRT), thin film transistor (TFT), liquid crystal display (LCD), light emitting diode (LED), organic LED (O-LED), plasma, etc. A display may also include touch screen input functionality, in some embodiments. The display devices may also be referred to as panels.

The host computing device 10 may include hardware and software to generate images for display on the host display 12. The hardware and software may produce images (or "frames") tailored to the properties of the host display 12. For example, the host display 12 may have an "aspect ratio" (a ratio of the number of pixels in a row of the frame to a number of rows of pixels in the frame), a resolution, panel-specific dither and gamma correction properties, panel-specific color space (e.g. RGB, YUV, YCrCb, etc.), panel-supported color depth (bits/color/pixel), etc.

In addition to the host display 12, the host computing device 10 includes an external interface to connect to the cable 14, which may connect to the external display 16. The external interface may be any type of standard or proprietary interface that is capable of transmitting video or multimedia (audio and video) data. In one embodiment, the connector supplied on the host computing device 10 to connect to the cable 14 may be a standard 30 pin connector that is included in the iPad and iPhone devices. The interface may be a 2 lane DisplayPort interface (with auxiliary, or Aux, channel as well). The DisplayPort interface may be defined in the specifications promulgated by the Video Electronics Standards Association, version 1.2 adopted on Dec. 22, 2009, or later versions of the standard. The DisplayPort interface will be used as an example of the host interface to the external display 16 for the remainder of this description. However, any other video and/or multimedia interface may be used. The host connector 18 in the cable 14 may thus be dictated by the connector supplied on the host computing device 10.

The transmission media 20 may include any electrically-conductive or optically-conductive material that is supported by the interface from the host computing device 10. For example, in an embodiment, the transmission media 20 may be a set of copper wires to carry the signals of the DisplayPort interface to the external display connector 22. There may also be wires to carry power and ground to the external display connector 22. The power and ground may be used by the video processing system 24 (i.e. the video processing system 24 may be powered by the host computing device 10).

The external display connector 22 may be configured to physically connect to the external display 16, depending on the type of connection that the external display 16 uses. For example, the external display 16 may support an HDMI connection, and the external display connector 22 may include an HDMI connector. The external display may support a VGA connection, and the external display connector 22 may include a VGA connector. Still another embodiment may support a DisplayPort connection. In some embodiments, a standard 30 pin connector may also be provided on the external display connector 22 for charging and syncing purposes.

The external display 16 may be any type of display. For example, the external display 16 may be an HDTV, or other HDMI-connected display. The external display 16 may be a projector that projects an image on a wall or drop-down screen in a meeting room. The external display 16 may be a VGA monitor, or a DisplayPort monitor. Any sort of screen may be supported, similar to the host display 12, such as CRT, TFT, LCD, LED, O-LED, plasma, etc.

The external display 16 may generally have properties that differ from the host display 12. For example, the resolution and/or aspect ratios may differ. The color depths and color spaces may differ. The gamma correction properties may differ. In order to provide consistent images to the viewers of the displays, the frames being displayed may be modified by the video processing system 24 according to the differences between the displays. In an embodiment, the video processing system 24 may include a memory storing a frame buffer into which a frame may be stored. The video processing system 24 may be configured to manipulate the frame in the frame buffer to create the desired frame for the external display, and then the video processing system 24 may be configured to transmit the modified frame to the external display 16 for display.

Generally, a frame may be data describing an image to be displayed. A frame may include pixel data describing the pixels included in the frame (e.g. in terms of various color spaces, such as RGB, YUV, or YCrCb), and may also include metadata such as an alpha value for blending. Static frames may be frames that are not part of a video sequence. Alternatively, video frames may be frames in a video sequence. Each frame in the video sequence may be displayed after the preceding frame, at a rate specified for the video sequence (e.g. 15-30 frames a second). Video frames may also be complete images, or may be compressed images that refer to other images in the sequence. If the frames are compressed, a video pipeline in host computing device 10 may decompress the frames.

Generally, a pixel value in a stream of pixel values may be a representation of a pixel to be displayed. The pixel value may include one or more color space values. For example, in an RGB color space, the pixel value includes a red value, a green value, and a blue value. Each value may range from zero to 2N-1 (for a color depth of N bits), and describes an intensity of the color for that pixel. Similarly, in the YCrCb color space, the pixel value includes a Y value, a Cr value, and a Cb value. The location of a pixel on the display may be inferred from the position of the corresponding pixel value in the pixel stream. For example, the pixel stream may be a series of rows of pixels, each row forming a line on the display screen. In a progressive-mode display, the lines are drawn in consecutive order and thus the next line in the pixel stream is immediately adjacent to the previous line. In an interlaced-mode display, consecutive passes over the display draw either the even or the odd lines, and thus the next line in the pixel stream skips one line from the previous line in the pixel stream. For brevity, the stream of pixel values may be referred to as a pixel stream, or a stream of pixels.

When the host computing device 10 is used to make a presentation, the size of primary display 12 may be inadequate for audience members. To facilitate such presentations, the external display 16 may be used. In this manner, the presenter may view the presentation on display 12 while the audience views the presentation on display 16. In other embodiments, the display 12 may become a controller for the video stream For example, the external display 16 may play a movie, and the host display 12 may provide start/stop controls for the movie and other controls such as volume, fast forward, rewind, etc. In another example, the external display 16 may display the slides of a presentation (e.g. in PowerPoint from Microsoft or Keynote™ from Apple Inc). The host display 12 may display the controls for navigating the slides, speaker notes, etc. In either the mirror mode or the command mode case, the frames to be displayed on the external display 16 may be sourced from the host computing device 10.

In the case that both the host display 12 and the external display 16 are to display the same frames, the system may be referred to as operating in mirror mode. In mirror mode, the host computing device 10 may be configured to prepare a frame for display on the host display 12, and may be configured to concurrently transmit the frame to the external display 16. The video processing system 24 may be configured modify the frames transmitted over the cable 14 to correct for different properties of the displays 12 and 16, and the modified frames may be displayed on the external display.

In the "command mode" mentioned above, the host computing device 12 may apply appropriate properties for the external display 16, since the frames for the external display are different from the frames on the host display 12. However, there still may be some processing desired by the video processing system 24 in such a case. For example, the frames may still be scaled for bandwidth purposes (as discussed below) and the video processing system 24 may perform the remaining scaling to recover the original aspect ratio.

In one embodiment, the bandwidth available on the DisplayPort interface from the host computing device 10 to the external display 16 may not be sufficient to carry the full-size frames. In such an embodiment, the host computing device 10 may include a scaler configured to scale the frames prior to transmission on the DisplayPort interface, to reduce the required bandwidth. For example, a horizontal scaling may be used to reduce the bandwidth. Other embodiments may include an interface having sufficient bandwidth to transmit the full-size image, and the video manipulation to adjust to different properties between the host display 12 and the external display 16 may be handled in the video processing system 24.

Host computing device 10 may include various circuitry (not depicted in FIG. 1) that are common to many computing devices. For example, the host computing device 10 include one or more processors, memories, graphics circuitry, I/O devices, bus controllers, etc.

Processors within device 10 may implement any instruction set architecture, and may be configured to execute instructions defined in that instruction set architecture. The processors may employ any microarchitecture, including scalar, superscalar, pipelined, superpipelined, out of order, in order, speculative, non-speculative, etc., or combinations thereof. The processors may include circuitry, and optionally may implement microcoding techniques. The processors may include one or more L1 caches, as well one or more additional levels of cache between the processors and one or more memory controllers. Other embodiments may include multiple levels of caches in the processors, and still other embodiments may not include any caches between the processors and the memory controllers.

Memory controllers within device 10 may comprise any circuitry configured to interface to the various memory requestors (e.g. processors, graphics circuitry, etc.). Any sort of interconnect may be supported for such memory controllers. For example, a shared bus (or buses) may be used, or point-to-point interconnects may be used. Hierarchical connection of local interconnects to a global interconnect to the memory controller may be used. In one implementation, a memory controller may be multi-ported, with processors having a dedicated port, graphics circuitry having another dedicated port, etc.

Memory within the device 10 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMM5), etc. Alternatively, the devices may be mounted with a system on a chip in a chip-on-chip configuration, a package-on-package configuration, or a multi-chip module configuration.

Graphics controllers within the device 10 may be configured to render objects to be displayed into a frame buffer in the memory. The graphics controller may include one or more graphics processors that may execute graphics software to perform a part or all of the graphics operation, and/or hardware acceleration of certain graphics operations. The amount of hardware acceleration and software implementation may vary from embodiment to embodiment.

In various embodiments, circuitry within computing device 10 (including some of the circuitry described above) may be implemented within a system on a chip (SoC). In one implementation, the device 10 includes integrated display 12, an SoC, memory, and the connector for the cable 14. The SoC may be coupled to the display, the memory, and the connector. Other embodiments may employ any amount of integrated and/or discrete implementations.

It is noted that, while the video processing system 24 is shown as encased within the external display connector 22, other embodiments may include the video processing system separately along the cable 20, if desired.

Figure 2:
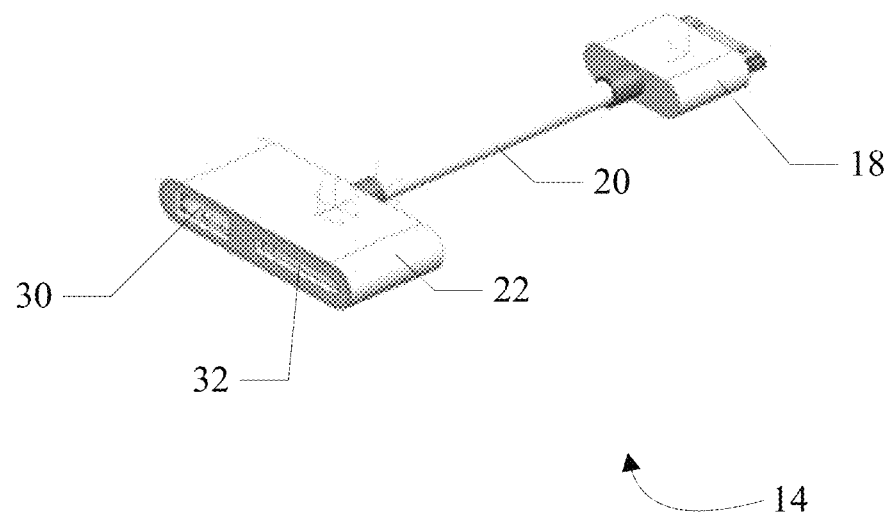
FIG. 2 is a three dimensional view of one embodiment of the cable shown in FIG. 1.

FIG. 2 is a three dimensional view of one embodiment of the cable 14. Shown in FIG. 2 is the host connector 18, the transmission media 20, and the external display connector 22. The video processing system 24 is encased within the external display connector 22 and is not visible in FIG. 2. In this embodiment, the external display connector 22 may include a HDMI connector 30 and a female 30 pin connector 32. Other embodiments may implement other connectors such as VGA or DisplayPort.

Figure 3:
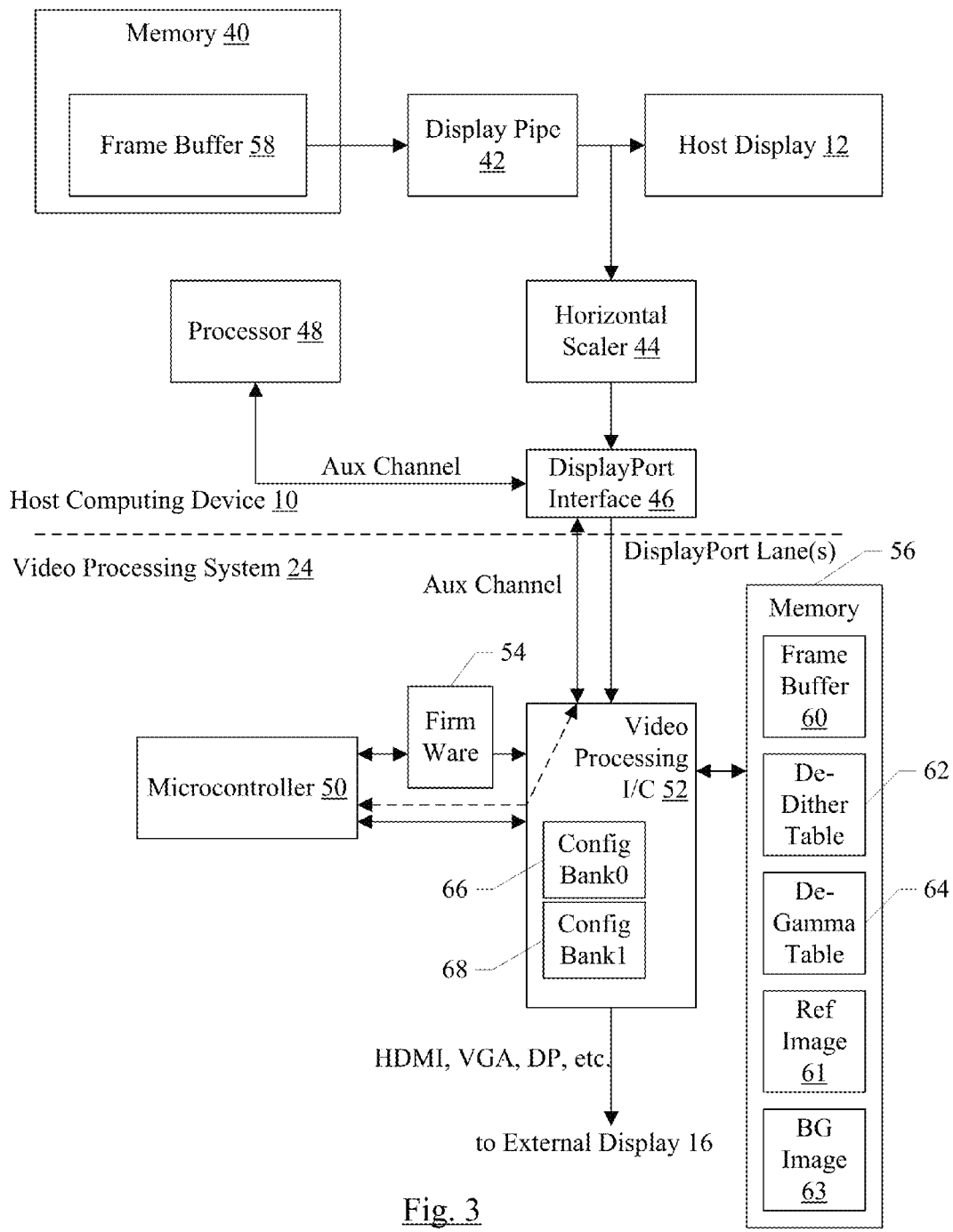
FIG. 3 is a block diagram illustrating certain details of one embodiment of the host computing device and the video processing system.

Turning now to FIG. 3, a block diagram illustrating certain components of the host computing system 10 and the video processing system 24 for one embodiment is shown. Note that the diagram of FIG. 3 illustrates a simplified logical interconnection of the various components. The actual connection between components may include additional components, not shown in FIG. 3. For example, a memory 40 is shown coupled to a display pipe 42. However, there may be a memory controller and communication fabric included in the coupling of the memory to the display pipe 42. Similarly, there may be various physical interface circuitry between the display pipe 42 and the host display 12. The horizontal dashed line in FIG. 3 illustrates the division between the host computing device 10 and the video processing system 24. For simplicity in the drawing, the transmission media 20 is not shown in FIG. 3 but couples the host computing system 10 and the video processing system 24.

As illustrated in FIG. 3, the host computing device 10 includes the memory 40, a display pipe 42, the host display 12, a horizontal scaler 44, a DisplayPort interface controller 46, and a processor 48. The display pipe 42 is coupled to the memory 40, the host display 12, and the horizontal scaler 44. The horizontal scaler 44 is coupled to the DisplayPort interface controller 46, which is further coupled to the processor 48. More particularly, the processor 48 may be coupled the DisplayPort interface controller 46 to use the Aux channel(s) to communicate with a microcontroller 50 in the video processing system 24. The DisplayPort transmission lanes (transmitting the video or multimedia data) may be coupled to a video processing integrated circuit (I/C) 52. Also shown in FIG. 3 is a firmware memory 54 and memory 56. The microcontroller 50 is coupled to the firmware memory 54 and the video processing I/C 52 (and may communicate, through the video processing I/C 52 and over the Aux channel, with the processor 48 in the host computing device 10). The video processing I/C 52 is further coupled to the DisplayPort lanes and Aux channel, the interface to the external display 16 (e.g. HDMI, VGA, DisplayPort, etc., in various embodiments), and the memory 56. As mentioned previously, the cable 14 may carry one or more power and ground inputs for the video processing system 24 as well. For example, there may be power inputs for one or more of the microcontroller 50, the firmware memory 54, the video processing I/C 52, and the memory 56.

As illustrated in FIG. 3, the memory 40 may be configured to store a frame buffer 58 that buffers a frame for display. The frame may be generated by various other components of the host computing device 10 (not shown in FIG. 3). The display pipe 42 may be configured to read frame data from the frame buffer and to process the frame data to provide a stream of pixel values for display. The display pipe 42 may be configured to perform a variety of operations on the frame data (e.g. scaling, video processing for frames that are part of a video sequence, dithering, gamma correction, color space conversion, etc.). Additionally, the display pipe 42 may be configured to blend multiple frames to produce an output frame. For example, in one embodiment, each frame pixel may have an associated alpha value indicating its opaqueness. The display pipe 42 may include one or more user interface blocks configured to fetch and process static frames (that is, frames that are not part of a video sequence) and one or more video pipelines configured to fetch and process frames that are part of a video sequence. The frames output by the user interface blocks may be blended with a video frame output by the video pipeline. The resulting pixel stream may be further dithered and gamma corrected, and may be provided to the host display 12 for display, and to the horizontal scaler 44 for transmission to the external display 16 in mirror mode.

As described previously, there may not be enough bandwidth available on the DisplayPort interface to transmit the full-size frame to the video processing system 24. Accordingly, the horizontal scaler 44 may scale the image horizontally to reduce the size of the frame to that which can be transmitted. In the embodiment shown, horizontal scaler 44 is configured to reduce the number of pixels (i.e., down-scale) in a line of pixels provided by display pipe 42. As one example, the horizontal scaler 44 may receive 2048 pixels for a given line of a frame to be displayed on display 12, and down-scale these input pixels to output 1440 pixels for a frame to be displayed on display 16. In another example, the horizontal scaler may receive 1536 pixels for a given line of a frame to be displayed on display 12, and may down-scale these input pixels to output 810 pixels.

The term "horizontal" scaling denotes processing within a given line of pixels of a frame (e.g., columns 1-2048 of row 1 of a frame), in contrast to processing such as vertical scaling in which pixels from multiple rows are involved. Accordingly, the horizontal scaling may be performed inline, without requiring line buffer.

In one embodiment, the down-scaling produced by the horizontal scaler 44 reduces pixel bandwidth through the external interface to support concurrent display of the images. In some embodiments, the horizontal scaler 44 may down-scale further to maintain the aspect ratio of the image as displayed on the primary display 12. In some implementations, the aspect ratio of the image may depend upon the orientation of the computing device, and the scaling unit may adjust a scaling factor accordingly. For example, in one embodiment, a computing device may have a resolution of 2048 columns by 1536 rows when the computing device is oriented in a "landscape" mode, and have a resolution of 2048 rows by 1536 columns when oriented in a "portrait" mode. The former orientation has an aspect ratio of 4:3; the latter has an aspect ratio of 3:4.

The scaled pixel stream is provided to the DisplayPort interface controller 46, which may be configured to packetize the pixel stream and transmit the packets over the DisplayPort lanes to the video processing I/C 52. The DisplayPort interface controller 46 may be configured to receive audio data from an audio source (not shown in FIG. 3), and may packetize the audio data in packets for transmission over the DisplayPort lanes as well. The video processing I/C 52 may be configured to extract the pixel stream from the video data packets, and may write the pixel stream to the frame buffer 60 in the memory 56. Once enough data is buffered in the frame buffer 60, the video processing I/C 52 may begin reading the frame buffer data and processing the data for transmission to the external display 16. For example, the video processing I/C 52 may perform vertical scaling on the frame to preserve the aspect ratio of the original frame in the host computing device 10. The vertical scaling may require a minimum number of rows to be available in the frame buffer 60. So, the video processing I/C 52 may buffer data in the frame buffer 60 until at least the minimum number of rows are available and then the video processing I/C 52 may begin the vertical scaling process.

The video processing I/C 52 may be configured to perform any subset of processing on the frame to produce the output pixel stream for the external display 16. The processing may include scaling, dither correction, gamma correction, color space conversion, etc. Generally, any video processing manipulation may be performed in various embodiments. Additional details are provided below with regard to FIG. 4 for one embodiment.

In one embodiment, the video processing I/C 52 may de-dither and de-gamma the frame data, reversing the dither and gamma processing that the display pipe 42 and/or other circuitry in the host computing device 10 may have applied to the data. To do so, the video processing I/C 52 may use the de-dither table 62 and the de-gamma table 64, respectively. The de-dither table 62 and the de-gamma table 64 may be provided by the host computing device 10 based on the dither and gamma processing being performed in the host computing device 10. While the de-dither table 62 and the de-gamma table 64 are shown stored in the memory 56 in the embodiment of FIG. 3, other embodiments may store one or both of the tables 62 and 64 on the video processing I/C 52 (e.g. in a cache or a dedicated buffer provided for these tables).

The microcontroller 50 may be configured to execute firmware from the firmware memory 54. Generally, the microcontroller 50 may communicate with the processor 48 over the Aux channel of the DisplayPort. In the illustrated embodiment, the microcontroller 50 may communicate over the Aux channel through the video processing I/C 52. In other embodiments, the microcontroller 50 may connect to the Aux channel directly. The processor 48 may be a central processing unit in the host computing device 10, and may execute operating system software to control operation in the system. The microcontroller 50 and the processor 48 may cooperate to boot the video processing I/C 52, download data as needed (such as the tables 62 and 64) and pass other control commands, examples of which are set forth below.

The video processing I/C 52 may also include one or more processors, and may execute firmware from the firmware memory 54 as well. The video processing I/C 52 may include any combination of hardware and software to implement the desired processing.

In an embodiment, the firmware in the firmware memory 54 may be field-upgradeable over the DisplayPort interface. The microcontroller 50 may be configured to authenticate a downloaded firmware update, in concert with the processor 48. Once the authentication is complete, the firmware may be upgraded by writing the firmware memory 54. Thus, the firmware memory 54 may be an updateable but non-volatile memory such as Flash memory. There may be more than one non-volatile memory device forming the firmware memory 54. For example, there may be one non-volatile memory device to store the firmware for the microcontroller 50 and another non-volatile memory device to store the firmware for the video processing I/C 52.

In the illustrated embodiment, the video processing I/C 52 includes two banks of configuration registers (bank 0 and bank 1, reference numerals 66 and 68, respectively). In an embodiment, the video processing I/C 52 may support switching between banks in response to a command from the microcontroller 50 and/or in response to a special symbol in the packet stream on the DisplayPort lanes. Switching banks of configuration registers may provide for seamless transitions between modes. For example, if switching from mirror mode to command mode (or vice versa), the processing performed by the video processing I/C 52 may change. In mirror mode, de-dither and degamma as well as dither and gamma processing may be performed, color space conversion may be performed, etc. In command mode, some or all of that processing may be performed on the host computing device 10. However, scaling may still be performed for bandwidth purposes.

Figure 8:
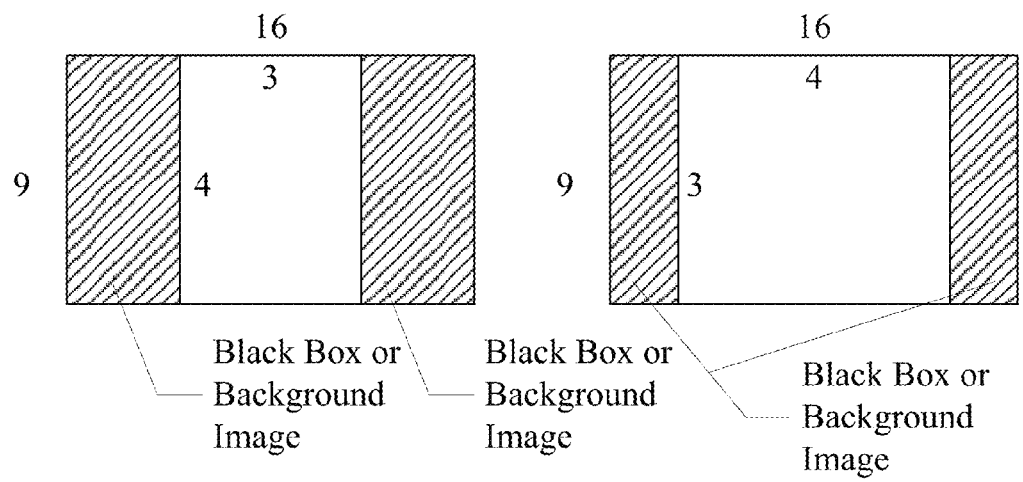
FIG. 8 is a block diagram illustrating display of an image from the host processing system on an external display having a different aspect ratio.

In the illustrated embodiment, the memory 56 may store one or both of two additional images 61 and 63. The images 61 and 63 may be frame buffers in the memory 56 as well. The reference image 61 may be a default image to be displayed on the external display 16. For example, if the external display 16 begins scanning for an input source, the video processing I/C 52 may detect that there is no data in the frame buffer 60 ready to be displayed, and may provide the reference image 61 instead. The reference image 61 may be displayed while the video processing system 24 and the host computing device 10 initialize and prepare for the actual images to be displayed. The background image 63 may be an image that is displayed in the "black box" areas of the display, as discussed in greater detail below with regard to FIG. 8. In some embodiments, the same image may be used for the background image and the reference image, and thus there may be only one image/buffer 61 in such embodiments. In an embodiment, one or both of the images 61 and 63 may be transmitted by the host computing system 10 using the Aux channel. Accordingly, the images 61 and 63 may be updated without consuming bandwidth from the video stream over the DisplayPort lanes.

Figure 4:
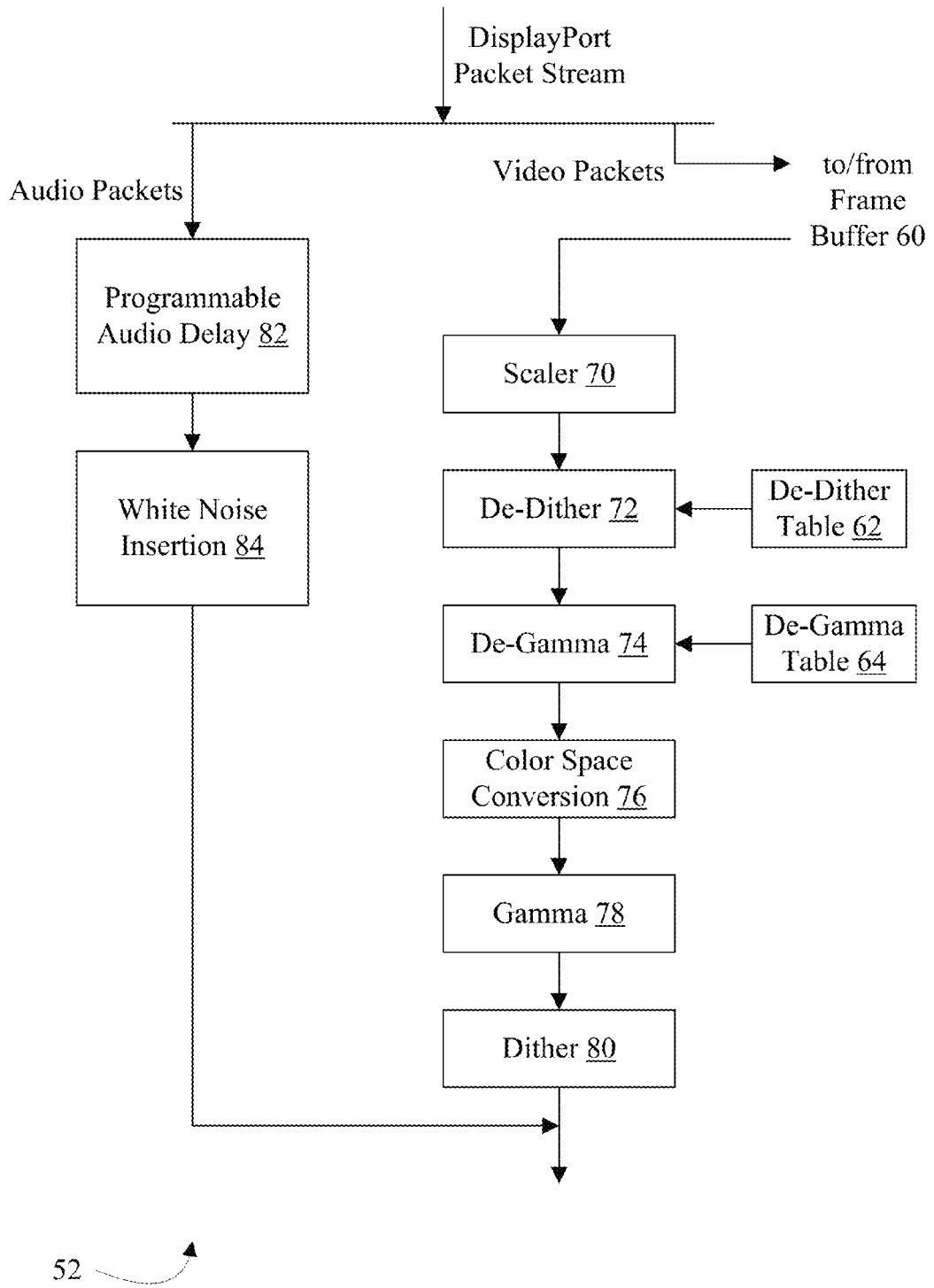
FIG. 4 is a block diagram illustrating one embodiment of processing by a video processing integrated circuit (I/C) shown in FIG. 3.

FIG. 4 is a block diagram illustrating various processing that may be supported by one embodiment of the video processing I/C 52. The blocks in FIG. 4 may be implemented in hardware, software (firmware), or any combination thereof.

As mentioned previously, the DisplayPort interface may be a packet stream that may include both audio packets and video packets. The video processing I/C 52 may be configured to separate the audio packets from the video packets. The video processing I/C 52 may be configured to extract the pixel data from the video packets and to write the pixel data to the frame buffer 60. Subsequently, when enough data is available for processing, the video processing I/C 52 may be configured to read the pixel data and process the data in one or more of the illustrated video processing stages.

The scaler 70 may be configured to perform scaling of the frame. In one embodiment, the scaler 70 may be configured to perform the vertical scaling to complement the horizontal scaling performed by the horizontal scaler 44, to recover the original aspect ratio of the frame as stored in the frame buffer 58. In an embodiment, the aspect ratio may be either 4×3 ("portrait") or 3×4 ("landscape"), and the vertical scale factor may be one of two scale factors based on the current orientation of the host computing device 10. The scaler 70 may be programmable with the scale factor, through the microcontroller 50 and the Aux channel from the processor 48.

The color depth and/or gamma correction properties of the external display 16 may differ from those supported by the host display 12. In mirror mode, the frame is transmitted with the properties corresponding to the host display 12. In order to modify the gamma correction, it may be necessary to de-dither the frame first. Additionally, if different dithering is desired, de-dithering the previously applied dither may be desired. The de-dither block 72 represents performing the de-dithering of the dither applied in the host computing device 10. The de-dither block 72 may use the de-dither table 62. The de-dither table 62 may be indexed by pixel location and/or pixel value depending on the dithering algorithm implemented in the host computing device 10. The result of the table 62 may be a de-dithered (higher color depth) value for the pixel.

The de-gamma block 74 may reverse the gamma correction previously applied in the host computing device 10. The de-gamma table 64 may be a lookup table based on pixel value to determine the appropriate de-gamma correction to apply.

The video processing I/C 52 may be configured to perform a color space conversion, based on the needs of the external display 16 (color space conversion block 76). That is, the input pixel stream may be in one color space (RGB, YUV, YCrCb) and the external display 16 may support a different one of the color spaces.

The video processing I/C 52 may be configured to apply gamma correction and dithering (blocks 78 and 80) that are appropriate for the external display 16. In one embodiment, the video processing I/C 52 may apply a standard gamma correction rather than a panel-specific gamma correction. Such correction may be applied if the external display 16 does not provide panel-specific information or if the panel-specific information is not deemed trustworthy. Other embodiments may apply the panel-specific gamma correction provided by the external display 16 if it is available. The dithering for the external display 16 may be based on the color depth of the external display as well.

For audio packets, the video processing I/C 52 may not provide much processing and thus there may be a programmable delay for the audio packets before merging them back with the video stream (block 82). The delay may be based on the approximate delay for the video processing being performed on the corresponding video data. Additionally, in one embodiment, the video processing I/C 52 may be configured to apply white noise to the audio data (block 84). In some cases, audio data that remains constant for too long may cause the external display 16 to conclude that there is no audio, and it may deactivate audio playback. By inserting white noise, the audio data may be forced to change somewhat to avoid such deactivation. In one embodiment, a linear feedback shift register (LFSR) based system may be used to modify the least significant bit of the audio data in a random fashion. Such a system may add random low frequency noise that may generally not be detectable by a viewer of the external display 16.

Figure 5:
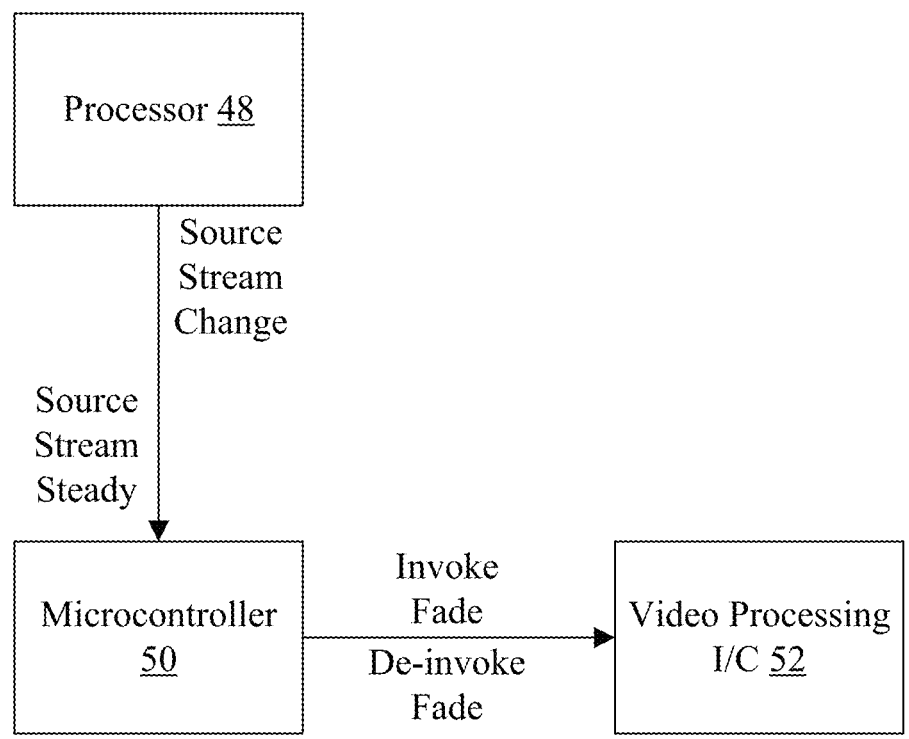
FIG. 5 is a block diagram illustrating one embodiment of a "fade" feature in one implementation.

Turning now to FIG. 5, a block diagram illustrating a "fade" feature which may be used in one embodiment of the system. The fade feature may be invoked in circumstances in which the source video stream is being subjected to significant change that is not desirable to display on the external display 16. For example, if the host processing system 10 is an iPad or iPhone device, rotating the device causes the orientation of the screen to rotate from portrait to landscape or vice-versa. The rotation may be animated as well. However, the external display 16 is not rotating. Accordingly, the rotation effects do not make visual sense on the external display 16. Another case in which the fade feature may be used is when starting and stopping a video sequence. The video may start and end with the fade. The fade feature may also be used when switching modes. In some cases, a "runt" frame may be transmitted by the host computing device 10, and the fade feature may be used to avoid display of the runt frame.

The processor 48 may be configured to detect that the source stream is changing in a fashion that is desirable to hide from the viewers of the external display 16. For example, in the rotation case mentioned above, the sensors in the host computing device 10 may be managed by the processor 48. The processor 48 may transmit a message to the microcontroller 50 indicating that the source stream change has been detected. The microcontroller 50 may process the message and may transmit an invoke fade command to the video processing I/C 52.

The fade may be implemented in a number of ways. For example, the fade may be a fade to black or some other desired color. Alternatively, the current image displayed by the video processing I/C 52 (e.g. from the frame buffer 60) may be retained on the external display 16 until the fade is de-invoked.

Once the source stream has steadied from the detected change (e.g. the rotation is complete), the processor 48 may transmit a second message to the microcontroller 50 over the Aux channel, indicating that the source stream is steady again. In response the microcontroller 50 may transmit a de-invoke fade command to the video processing I/C 52. The video processing I/C 52 may be configured to begin processing the input video stream from the DisplayPort in response to de-invoking the fade.

In the case of the rotation, for example, the above operation may result in the image on the external display 16 remaining constant while the rotation occurs. After the rotation, the aspect ratio may change but otherwise the change may appear more smooth to the viewer of the external display 16.

Figure 6:
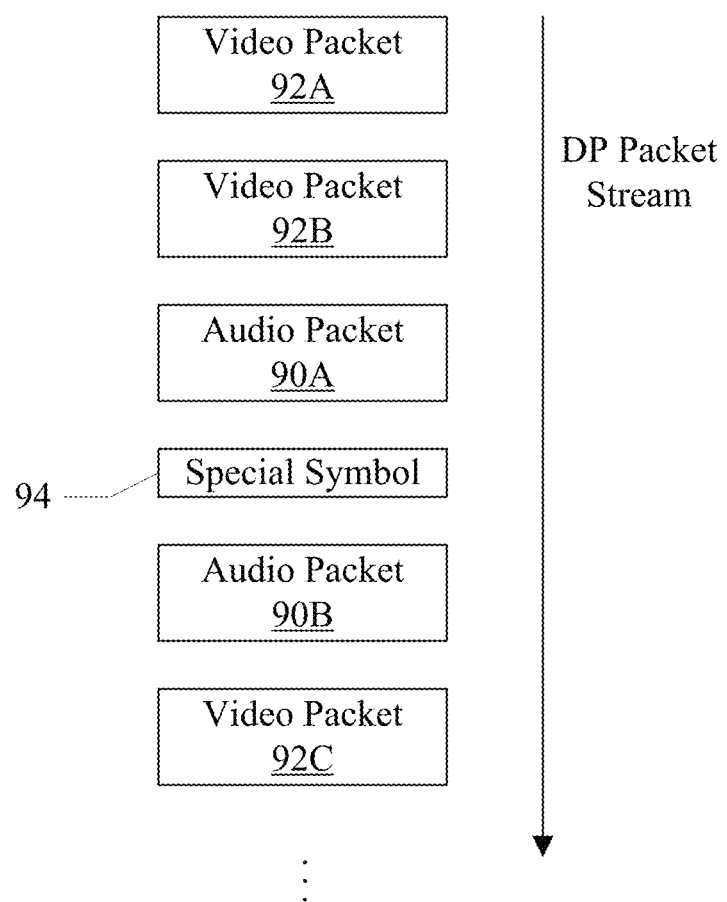
FIG. 6 is a block diagram of one embodiment of a DisplayPort packet stream.

Turning next to FIG. 6, a block diagram is shown illustrating a set of packets transmitted over the DisplayPort is shown. As mentioned previously, the DisplayPort interface is a multimedia interface transmitting both audio and video data. Thus, exemplary audio packets 90A-90B and video packets 92A-92C are shown in the DisplayPort packet stream. The packets may be formatted as specified in the DisplayPort specification.

Additionally, a special symbol 94 is shown in the DisplayPort packet stream. The special symbol 94 is coded in a fashion that is distinguishable from the packets 90A-90B and 92A-92C. For example, packets may be delimited by start of packet and/or end of packet symbols. The special symbol may be a different symbol transmitted outside of the start of packet and end of packet symbols, and thus may be recognized by the receiver (e.g. the video processing I/C 52 in this embodiment). Alternatively, the special symbol may be defined as a different packet header encoding.

Embedding special symbols in the packet stream of the DisplayPort may permit the sending of messages directly to the video processing I/C 52 (rather than through the Aux channel and the microcontroller 50. Such messages may be more accurately timed to the audio and video packets around them. One example of using the special symbol may be to switch between configuration register banks 66 and 68. Another example may be to implement the fade feature described above. The special symbol may be used to invoke and de-invoke the fade at appropriate times. The fade may be signalled over the Aux channel, and the special symbol may serve as a timing marker, in an embodiment. In another embodiment, the special symbol may itself be the message to invoke or de-invoke the fade.

Generally, the special symbol may be inserted by the host computing device 10 in the DisplayPort packet stream. For example, the processor 48 may execute operating system software that detects the need to insert the special symbol. The processor 48 may communicate the special symbol to the DisplayPort interface controller 46 for insertion. The video processing I/C 52 may detect the symbol when parsing audio and video packets from the DisplayPort packet stream.

Figure 7:
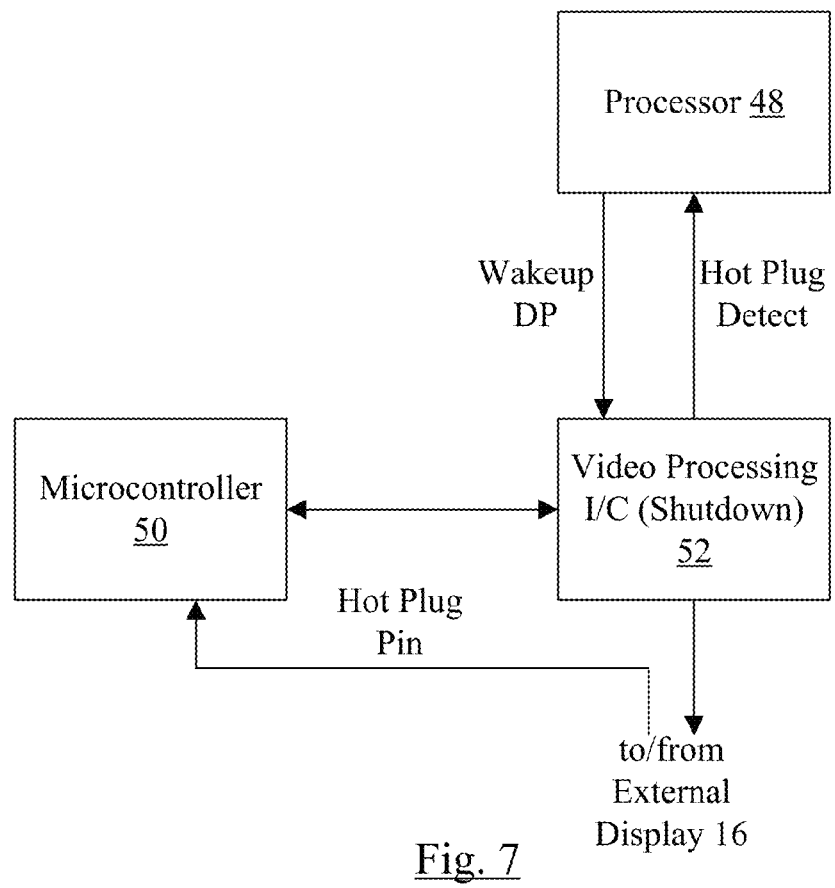
FIG. 7 is a block diagram of one embodiment of hot plug monitoring in the cable.

FIG. 7 is a block diagram illustrating operation of one embodiment of the cable 14 in a low power mode. As mentioned previously, the video processing system 24 may draw power from the host computing device 10. The host computing device 10 may be a portable device operating on battery power (e.g. a tablet computer, a smart phone, or a laptop). Additionally, the ability of the external display connector 22 (or other housing, in other embodiments) to dissipate thermal energy may be limited. Accordingly, saving power when not in use may be highly desirable.

On the other hand, it is possible while the video processing system 24 is powered down for the cable 14 to be plugged into an external display 16. It may be desirable to detect the plugging in of an external display 16 and to communicate the event to the host computing device 10. In an embodiment, the video processing I/C 52 may be shutdown (powered off) while not in use. The microcontroller 50 may remain powered in a low power state, and may wake up at a desired interval to check for the plug-in event. There may be a watchdog timer or other mechanism in the video processing system 24 to cause the wakeup, or a message from the processor 48 (e.g. over the Aux channel) may be used to cause the wakeup.

For example, there may be a hot plug pin that may be asserted by an external display 16 when the external display 16 is connected to the cable 14. The microcontroller 50 may monitor the status of the pin, and if the pin is asserted (at the time of a wakeup of the microcontroller 50), the microcontroller 50 may transmit a message to the processor 48 (over the Aux channel of the DisplayPort interface) indicating detection of the hot plug event. The processor 48 may determine if use of the external display 16 is desired, and may communicate a wakeup DisplayPort message to the microcontroller 50. The microcontroller 50 may initialize the video processing system 24 in response to the message, so that the host computing device 10 may begin using the external display 16. The messages between the microcontroller 50 and the processor 48 may be transmitted over the Aux channel, as mentioned above. Since the video processing I/C 52 is powered down and is the connection to the Aux channel in this embodiment, the video processing I/C 52 may be powered up temporarily for communications. Alternatively, a portion of the video processing I/C 52 may be designed to remain active, permitting microcontroller 50 communication on the Aux channel, while other portions are powered down.

As discussed above, the video processing system 24 may attempt to preserve the aspect ratio of the frame as generated on the host computing device 10. The combination of the horizontal scaling by the horizontal scalar 44 and vertical scaling by the video processing I/C 52 may be used to retain the aspect ratio in the present embodiment. In other embodiments in which the DisplayPort bandwidth is sufficient to permit transmission of unscaled frames (or in embodiments in which other compression schemes may be used), the video processing I/C 52 may manipulate the frame locally but retain the aspect ratio.

Figure 9:
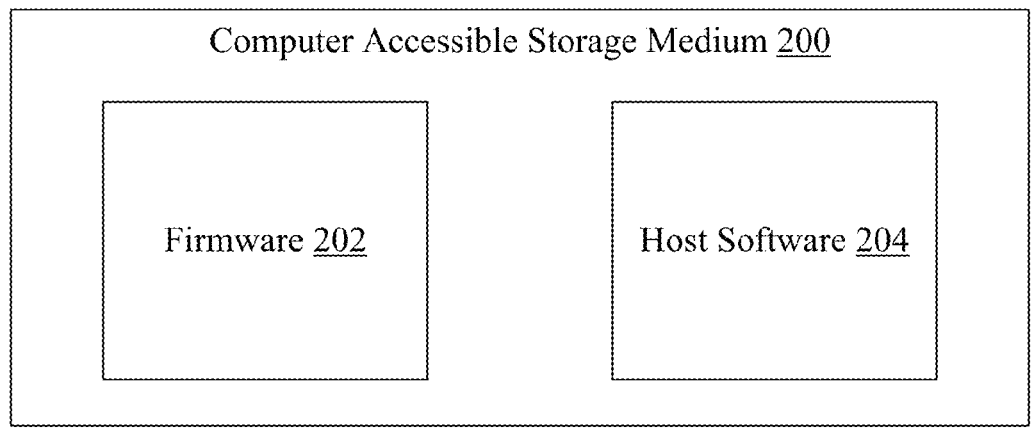
FIG. 9 is a block diagram of one embodiment of a computer accessible storage medium.

The external display may have a different aspect ratio. For example, HDMI displays typically have a 16×9 aspect ratio, as shown in FIG. 9. However, the host display 12 may have a 3×4 aspect ratio (portrait) or 4×3 aspect ratio (landscape). Accordingly, the frame displayed on the external display 16 may include the image in 3×4 or 4×3, along with "bars" on either side. Typically, the bars may be black pixels. However, in one embodiment, the video processing I/C 52 may support a background image 63 (e.g. another frame buffer in the memory 56) that provides content for the bars on the external display 16. The image may be static, or may change over time (and thus the frame buffer in the memory that stores the background image 63 may change over time). For example, a battery status indicator may be displayed in the "bar" zones, indicating that remaining battery life in the host computing device 10.

Turning next to FIG. 9, a block diagram of one embodiment of a computer accessible storage medium 200 is shown. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g. synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB).

The computer accessible storage medium 200 in FIG. 9 may store firmware 202 and/or host software 204. The firmware 202 may be the firmware stored in the firmware memory 54. The host software 204 may include instructions executed by the processor 48 to carry out the various features described as being performed by the processor 48 above. A carrier medium may include computer accessible storage media as well as transmission media such as wired or wireless transmission.

Numerous variations and modifications will become apparent to those skilled in the art once the above disclosure is fully appreciated. It is intended that the following claims be interpreted to embrace all such variations and modifications.

What is claimed is:

1. A cable comprising:
    a host connector configured to connect to a host computing device;
    an external display connector configured to connect to an external display;
    a transmission medium coupled between the host connector and the external display connector; and
    a video processing system embedded in the cable, wherein the video processing system, in response to a communication by the host computing device that a source video stream is changing in a fashion that is not to be displayed on the external display, is configured to invoke a fade feature.

2. The cable as recited in claim 1 wherein, in response to a second communication by the host computing device that the source video stream has stabilized, the video processing system is configured to de-invoke the fade feature.

3. The cable as recited in claim 2 wherein the second communication is a symbol embedded in a source video stream.

4. The cable as recited in claim 2 wherein, in response to de-invoking the fade, the video processing system is configured to transmit frames from the host computing device for display on the external display.

5. The cable as recited in claim 1 wherein the fade feature comprises fading the external display to black.

6. The cable as recited in claim 1 wherein the fade feature comprises retaining a most recent frame from the host processing system and displaying the retained frame.

7. The cable as recited in claim 1 wherein a change in the source video stream that is not to be displayed is a rotation of the image in response to a change in orientation of the host processing device.

8. The cable as recited in claim 1 wherein the communication is a symbol embedded in a source video stream.

9. The cable as recited in claim 1 wherein the video processing system comprises a plurality of banks of configuration registers, and wherein the video processing system is configured to switch between one of the plurality of banks and another one of the plurality of banks responsive to a second communication from the host computing device.

10. The cable as recited in claim 9 wherein the second communication is a symbol embedded in a source video stream.

11. The cable as recited in claim 1 wherein the cable is configured to carry audio data in addition to the frames, and wherein the video processing system comprises a programmable delay for the audio data, wherein the delay is programmable to match a video delay through the video processing system.

12. The cable as recited in claim 1 wherein the cable is configured to carry audio data in addition to the frames, and wherein the video processing system comprises a white noise block configured to insert low frequency white noise on the audio data.

13. The cable as recited in claim 1 wherein the video processing system comprises a memory configured to store the frames being manipulated, and wherein the memory is further configured to store a second image, and wherein the video processing system is configured to display the second image on the external display responsive to a lack of frames received from the host computing device.

* * * * *